United States Patent Office 3,264,787
Patented August 9, 1966

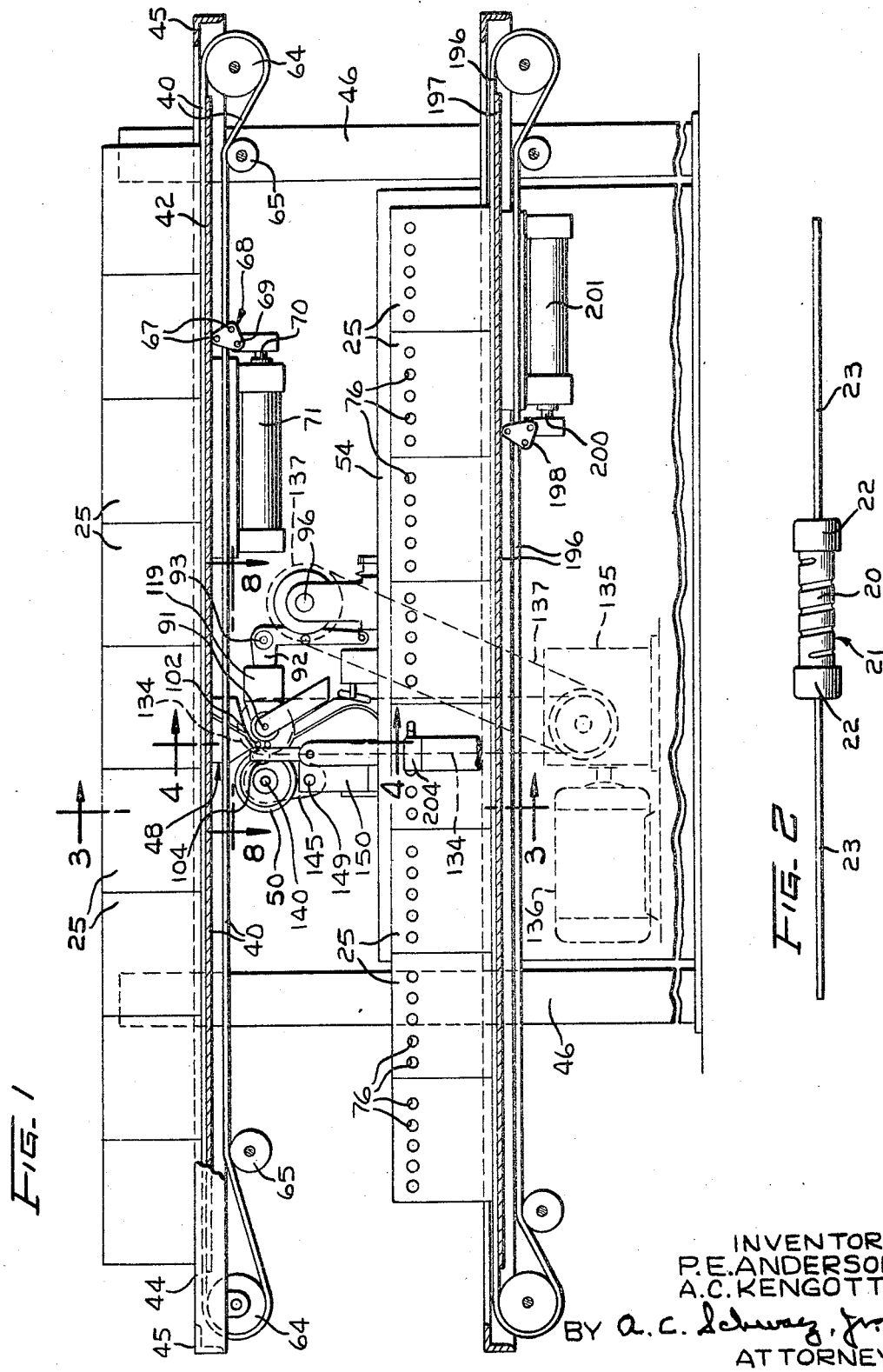

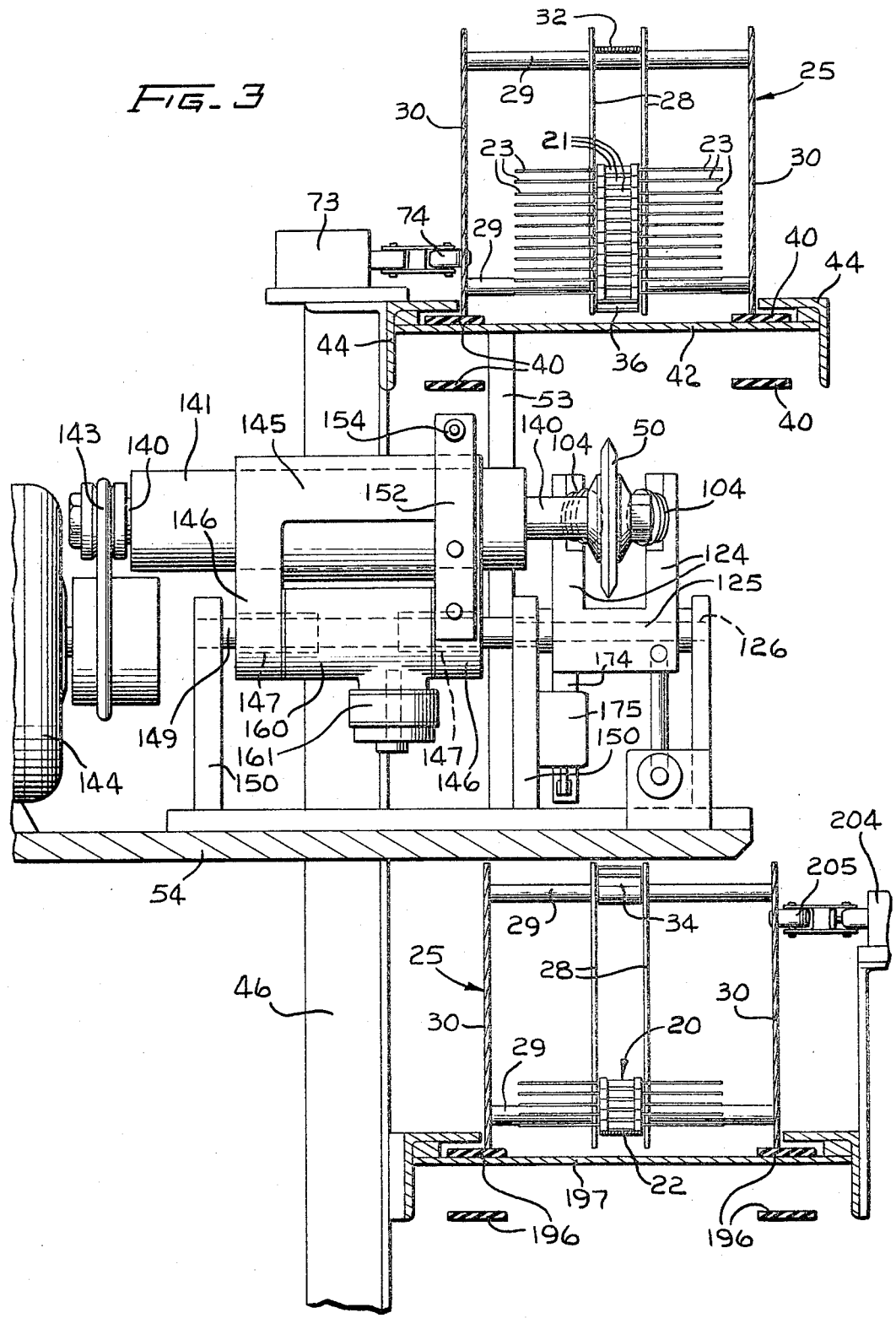

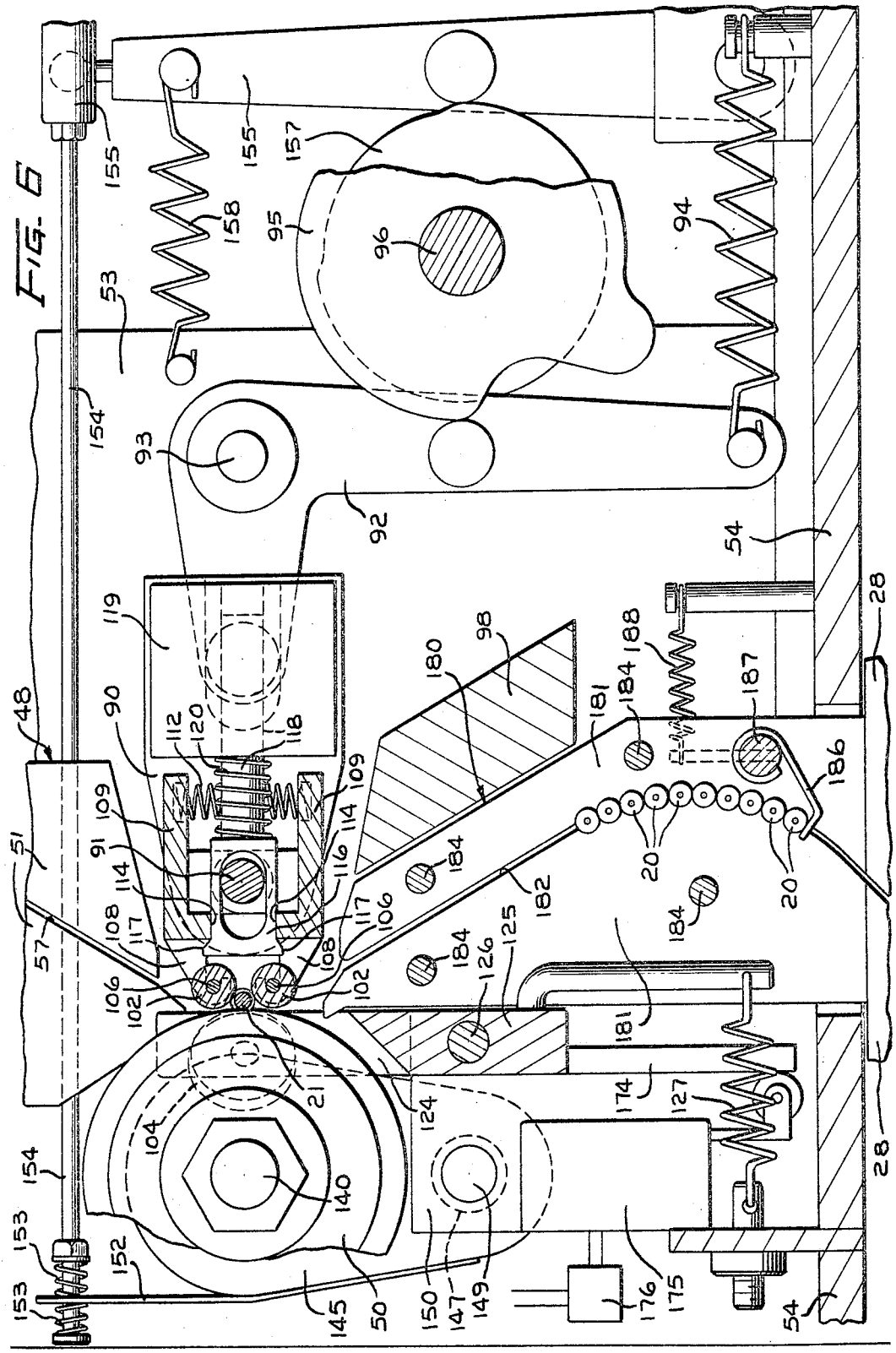

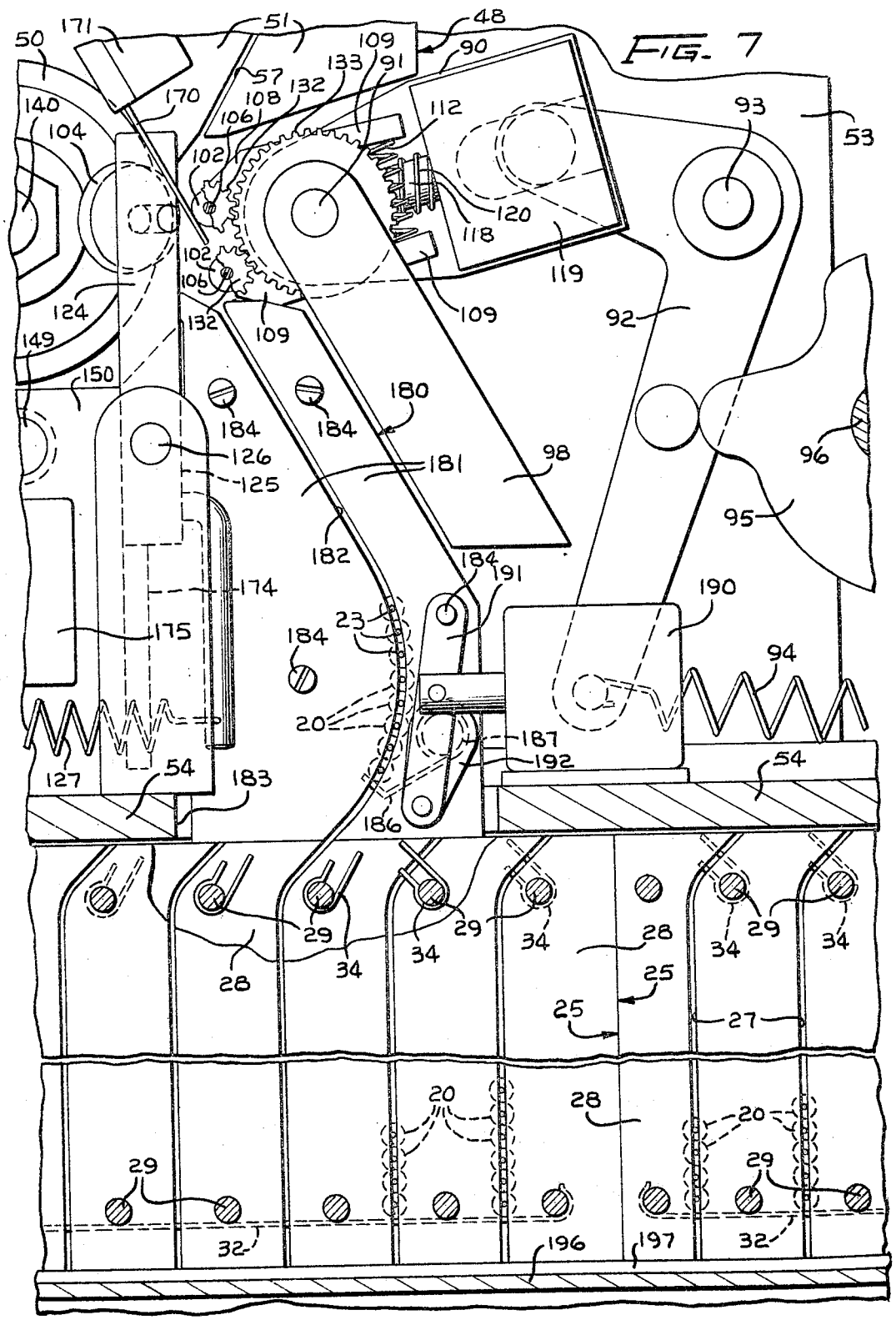

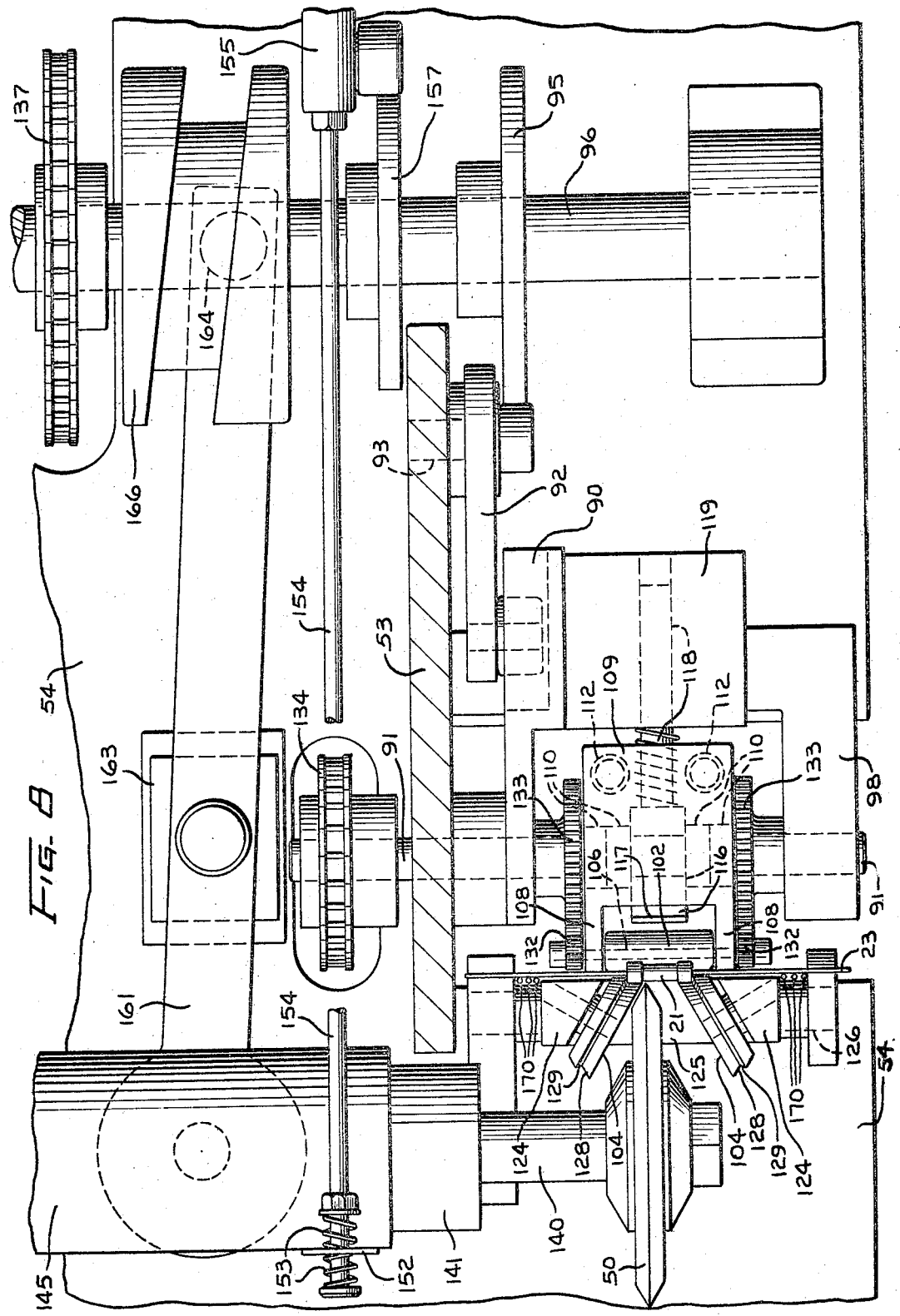

3,264,787
APPARATUS FOR AUTOMATICALLY FEEDING AND CUTTING HELICAL FILM RESISTORS
Paul E. Anderson, Hinsdale, and Alfred C. Kengott, Lombard, Ill., assignors to Western Electric Company, Incorporated, New York, N.Y., a corporation of New York
Filed Jan. 8, 1964, Ser. No. 336,477
10 Claims. (Cl. 51—37)

This invention relates to apparatus for cutting helical film resistors, and more particularly to an apparatus for automatically feeding film resistors, cutting helical grooves therein and magazining the helical cut resistors.

An object of the invention is to provide an effective and efficient apparatus for cutting helical film resistors.

Another object of the invention is to provide an apparatus for automatically feeding uncut film resistors, cutting helical grooves in the film resistors and magazining the helical film resistors.

An apparatus illustrating certain features of the invention may include a plurality of magazines, each provided with a series of vertically disposed slots for receiving rows of resistors therein and having clips adjacent the lower portions of the slots movable to closed position to retain the resistors when the magazines are inverted, an upper conveyor for intermittently advancing a row of inverted magazines to align successive sets of slots in the magazine with slots in an upper hopper of the apparatus, and a stationary element for moving successive clips from closed position to open position to allow successive rows of resistors to move downwardly from the magazine into the upper hopper and be yieldably retained therein by an escapement mechanism.

A pair of parallel, laterally disposed drive rollers are mounted on a holder for oscillatable movement to an upper position adjacent the upper hopper in response to which movement a resistor is released from the hopper and drops into a nest formed by the driving rollers and a pair of backup rollers, after which the driving rollers are moved to an intermediate position to carry the resistor to a cutting position in engagement with the leads of a device for measuring the resistance thereof, and in cooperation with the biased backup rollers to support the resistor in such cutting position in laterally spaced and close proximity to a cutting wheel.

Mechanisms are provided for rotating the driving rollers to impart rotation to the resistor, for rotating the cutting wheel, and for moving the cutting wheel laterally into engagement with the resistor and then axially thereof to cut a helical groove in the periphery of the resistor. When the resistance of the resistor has reached a predetermined value, mechanism under control of the resistance measuring device is actuated to separate the driving rollers slightly and effect the disengagement of the resistor from the cutting wheel and thereafter to move the driving rollers to a lower position to release the cut resistor and allow it to drop into a lower hopper of the apparatus. The drive rollers are then returned to the upper position to initiate another groove cutting cycle of operation.

A movable member under control of a device for counting the number of cut resistors entering the lower hopper serves to yieldably retain the cut resistors in the lower hopper until a predetermined number have accumulated, at which time mechanism under control of the counting device retracts the retaining member to allow the cut resistors to drop from the lower hopper into aligned slots of one of a row of the magazines supported upright on a lower conveyor. This conveyor is then actuated to advance the lower row of magazines until the following set of slots therein are in a predetermined alignment with the lower hopper.

The row of resistors in the upper hopper intercept a light beam of a control circuit so that as the supply of resistors is diminished and the row of resistors moves below the light beam, the control circuit operates to effect the actuation of the upper conveyor to advance the row of magazines until the following set of magazine slots and associated row of resistors therein are brought into registration with the slots in the upper hopper to replenish the supply of resistors therein.

Other objects, advantages and novel aspects of the invention will become apparent upon consideration of the following detailed description, in conjunction with the accompanying drawings, in which:

FIG. 1 is a fragmentary side elevational view of the apparatus embodying the present invention;

FIG. 2 is an elevational view of a resistor with a helical groove cut therein with the present apparatus;

FIG. 3 is an enlarged vertical cross-sectional view of the apparatus taken on the line 3—3 of FIG. 1;

Figure 4:
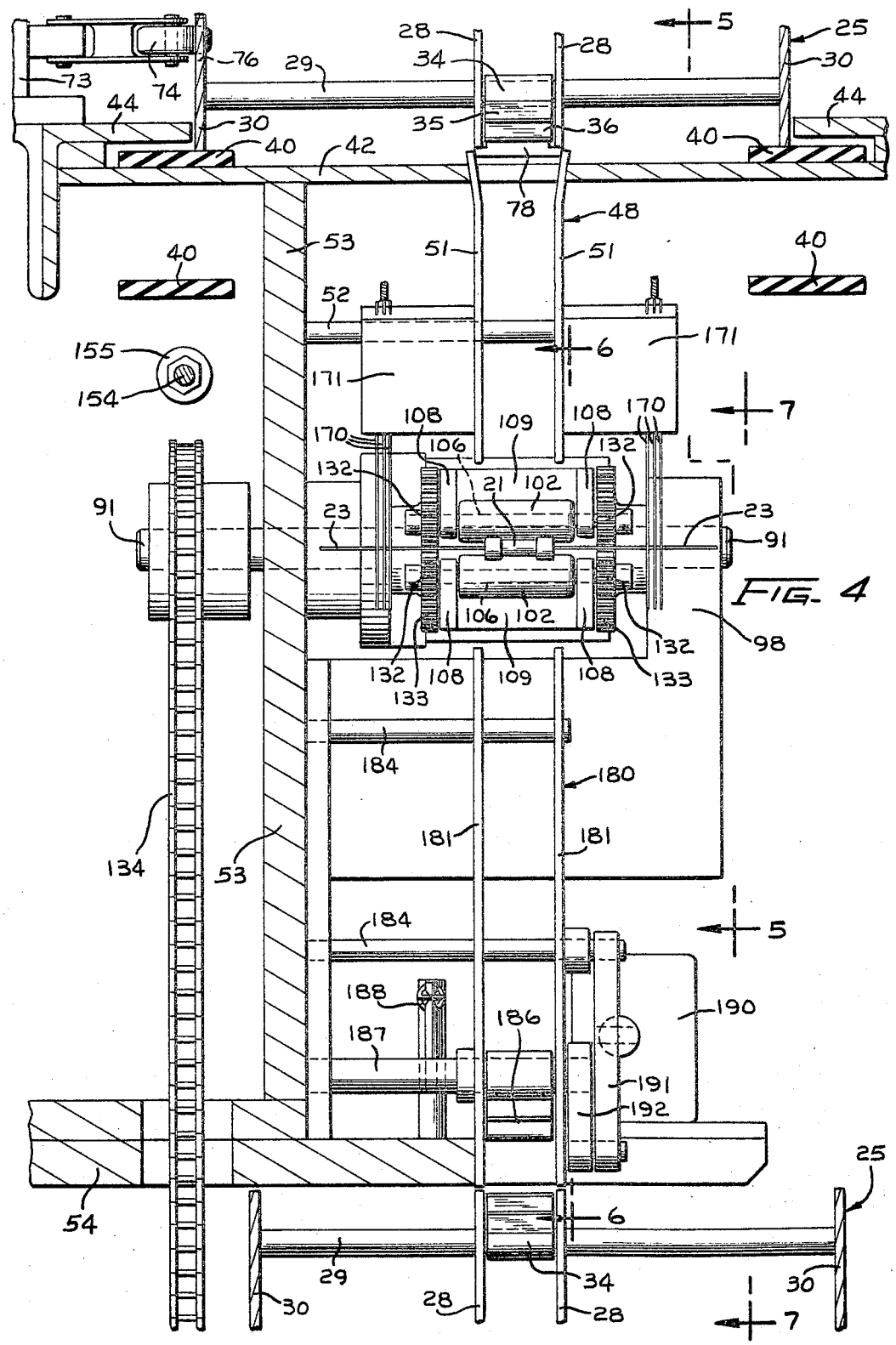
FIG. 4 is a further enlarged vertical cross-sectional view of the apparatus taken on the line 4—4 of FIG. 1.
Figure 5:
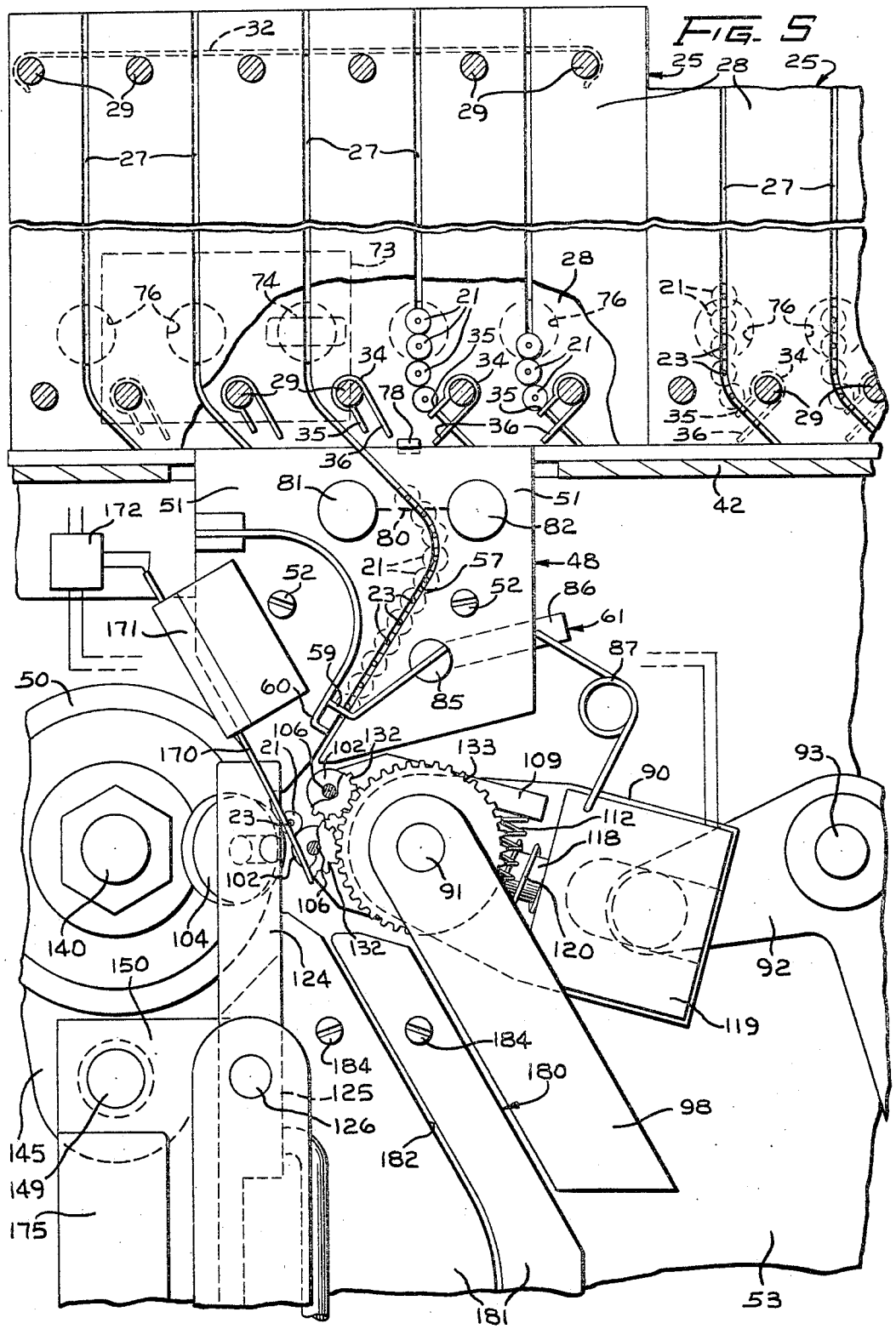

FIGS. 5, 6 and 7 are fragmentary vertical longitudinal sectional views of the apparatus taken on the lines 5—5, 6—6 and 7—7, respectively, of FIG. 4 and showing the driving rollers in upper, intermediate, and lower positions respectively; and FIG. 8 is a fragmentary plan sectional view taken on the line 8—8 of FIG. 1.

The present apparatus serves primarily to cut a helical groove 20 in a carbon-deposited film on a cylindrical body of dielectric of a resistor 21 (FIG. 2) while measuring the resistance thereof and to terminate the cutting of the groove when the resistance has reached a predetermined value. The resistor has metal terminal caps 22 secured to the ends thereof and wire leads 23 extending axially therefrom.

The resistors 21 are stacked in rows in magazines 25 (FIGS. 1, 3–5 and 7) with the leads 23 fitting in slots 27 in a pair of laterally spaced, vertically disposed intermediate plates 28 of the magazines and with the bodies of the resistors positioned between the plates. The plates 28 are mounted on rods 29 extending between and secured to vertically disposed outer plates 30 of the magazines adjacent the upper and lower margins thereof. To support the rows of resistors in the slots 27 retaining members 32 are secured at their ends to the lower rods 29 (FIG. 7) and extend across the bottom of the magazine. Metal retaining clips 34 are pivotally supported on the upper rods 29 between the plates 28 for movement to a first position to engage the caps 22 of the upper ends of the rows of resistors and hold them in the magazines 25 when the magazines are turned upside down. The intermediate portions of the clips 34 encircle and grip the rods and have parallel fingers 35 and 36 of different lengths extending therefrom.

A plurality of the magazines 25 filled with resistors 21 are placed upside down onto a pair of conveyor belts 40 supported on an upper platform 42 (FIGS. 1, 3–5). The platform 42 extends between and is secured to a pair of parallel, angle-shaped, horizontally disposed, longitudinal frame members 44 which are interconnected at their ends by members 45 and are secured to a pair of vertically disposed frame members 46 (FIGS. 1 and 3).

The horizontal flanges of the frame members 44 serve as rails for guiding the row of magazines 25 along a straight path above an upper hopper 48 (FIGS. 4 and 5) for receiving and supporting a supply of uncut resistors above and adjacent to a diamond cutting wheel 50 for cutting the grooves 20 in the resistors. The hopper 48 comprises two sets of laterally spaced vertically disposed plates 51 which extend downwardly from the platform 42 in vertical alignment with the intermediate plates 28 of the magazines 25 on the conveyor belts and which are supported on rods 52. The rods 52 are secured to a vertical frame plate 53 (FIG. 4) that extends upwardly from a horizontal frame plate 54 to the upper platform. Slots 57 are formed by the plates 51 for receiving the leads 23 of the resistors 20, and pairs of cooperating elements 59, 60 of an escapement mechanism 61 (FIG. 5) releasably support the resistors therein.

The belts 40 for advancing the row of magazines 25 are guided around end pulleys 64 (FIG. 1) and intermediate pulleys 65 suitably supported on the upper platform 42, and each belt 40 passes between a pair of gripping elements 67 of a one-way belt gripping device 68. The belt gripping device 68 is pivotally connected by a rod 69 to the head of a piston rod 70 of a fluid-operated actuator 71 secured to the platform 42.

In response to operation of the actuator 71 and the forward movement of the piston rod 70, the belts 40 are gripped by the device 68 and actuated thereby to advance the row of magazines 25 until the lower ends of a set of magazine slots 27 are aligned with the slots 57 in the upper hopper plates 51, at which time the actuator 71 is reversed and the belts stopped in response to actuation of a control switch 73 (FIGS. 3–5). The switch 73 is mounted on the platform 42 adjacent to the row of magazines 25 and has an actuating lever with a roller 74 thereon biased into engagement with the outer walls 30 of the row of magazines and movable into apertures 76 in the outer plates 30 of the magazines for effecting the stopping of the feeding movement of the conveyor belts 40. The apertures 76 individual to the sets of slots 27 and in lateral alignment therewith are arranged in a horizontal row adjacent the upper portion of each of the magazines 25 for effecting the actuation of the switch when the magazines are supported on the conveyor belts 40 in the inverted position. During the return movement of the piston rod 70, the gripping device 68 is released from the belts 40 which remain idle.

A stationary trip element 78 (FIG. 5) is secured to the upper edges of the hopper plates 51 in the path of the resistor retaining clips 34 and in advance of the hopper slots 57 for engaging the fingers 36 of the clips 34 and rotating the clips from closed position to open position to release the row of resistors 21 in the associated slots 27 of the magazine and allow them to drop into the slots 57 of the upper hopper 48.

As the resistors 21 move downwardly in the upper portion of the slots 57 in the upper hopper 48 they intercept a light beam 80 directed from a source of light 81 to a photoelectric cell 82 (FIG. 5) which are suitably mounted between the upper portion of the hopper plates 51. The photoelectric cell 82 is connected to a control circuit for effecting the operation of the belt actuator 71 to advance the row of magazines 25 when the resistors 21 in the upper hopper 48 drop below the light beam 80.

The escapement finger 59 is secured to a rock shaft 85 which is pivotally supported in the hopper plates 51 and has an arm 86 extending therefrom. A spring 87 interconnects the end of the arm 86 with a rocker arm 90 which is pivotally supported on a shaft 91 and is selectively movable to several positions by a bell crank lever 92. The lever 92 is pivotally supported at 93 on the vertical frame plate 53 and is actuated by a spring 94 and a cam 95 on a cam shaft 96. The shaft 91 (FIGS. 4 and 8) is supported in bearing apertures in the vertical frame plate 53 and in a bracket 98 suitably secured to the frame plate. In response to movement of the rocker arm 90 to the position shown in FIG. 5, the escapement mechanism is actuated to release a resistor 21 which drops from the hopper 48 into a nest formed by a pair of driving rollers 102 in an upper position and a pair of backup rollers 104.

The driving rollers 102, of soft rubber or similar material, are secured to shafts 106, each of which is journaled in a pair of arms 108 of a carrier plate 109 (FIGS. 6 and 8). The carrier plates 109 are mounted for pivotal movement on the shaft 91 and have mounting bosses 110 (FIG. 8) provided with apertures for receiving the shaft 91 therethrough. A pair of springs 112 interposed between the end portions of the carrier plates 109 urge the plates for pivotal movement about the shaft 91 in directions to move the driving rollers 102 toward each other to an operative first position in which they are stopped by the engagement of abutments 114 on the carrier plates 109 with the opposite parallel surfaces of a roller positioning member 116.

The member 116 which is slotted for receiving the shaft 91 therethrough is mounted for movement toward and away from the driving rollers 102 and is provided with a pair of oblique cam surfaces 117. A cylindrical extension 118 on the member 116 is slidable in a solenoid 119 that is mounted on the rocker arm 109 for movement therewith and a spring 120 seated against the solenoid urges the positioning member 116 to a normal forward position (FIG. 6). In response to energization of the solenoid the member 116 is retracted and the cam surfaces 117 thereon serve to rock the carrier plates 109 on the shaft 91 and move the driving rollers 102 further away from each other to a second position.

It will be understood that the driving rollers 102 and the carrier plates 109 which form a holder therefor are oscillatable about the shaft 91 with the rocker arm 90 and are moved thereby to an upper or resistor receiving position (FIG. 5), an intermediate or cutting position (FIG. 6), and a lower or ejecting position (FIG. 7). In response to actuation of the rocker arm 109 and the movement of the pair of driving rollers 102 from the upper position to the intermediate position, the resistor 21 is carried therewith and is supported by the driving rollers and the backup rollers 104 in horizontal alignment with the cutting wheel 50 and in close proximity thereto.

As clearly shown in FIG. 8, the backup rollers 104 are positioned on opposite sides of the cutting wheel 50 and are mounted on the upper ends of vertically disposed arms 124 for rotation about axes which are disposed obliquely with respect to the axes of the resistor 21 and the driving rollers 102. The arms 124 extend upwardly from a member 125 (FIGS. 3 and 5) that is pivotally supported on a rod 126 and is stressed by a spring 127 in a direction to urge the backup rollers 104 and the resistor 21 away from the cutting wheel 50 toward the driving rollers 102. The backup rollers 104 are grooved to provide conical surfaces 128 engageable with peripheral portions of the resistor caps 22 for urging the resistor 21 against the driving rollers 102 and conical surfaces 129 engageable with end portions of the caps 22 to hold the resistors against axial displacement.

Rotation is imparted to the driving rollers 102 by drive mechanism including gears 132 mounted on the shafts 106 (FIGS. 4, 5 and 8) at opposite ends of the driving rollers 102, a pair of gears 133 meshing with the gears 132 and secured to the shaft 91, chain and sprocket connection 134 (FIG. 1) from the shaft 91 to a transmission unit 135, and a drive motor 136. Through a chain and sprocket connection 137 the cam shaft 96 is also driven from the transmission unit 135.

Referring now to FIGS. 3, 6 and 8, the cutting wheel 50 is mounted on a shaft 140 which is rotatable in a bearing sleeve 141 and is driven through a pulley and belt connection by a motor 144 secured to the horizontal frame plate 54. The bearing sleeve 141 is supported in a holder 145 having a pair of downwardly projecting apertured arms 146 that are provided with bushings 147 which are slidably supported on a fixed rod 149 for oscillatable and longitudinal movement relative thereto. The rod 149 is fixedly supported in brackets 150 secured to the horizontal frame plate 54. The holder 145 is yieldably connected by a leaf spring 152 and helical springs 153 to one end of a rod 154 which is connected at its other end to a lever 155. The lever is actuated by a cam 157 on the cam shaft 96 in cooperation with a spring 158 for effecting the oscillation of the holder 145 about the rod 149 and the movement of the cutting wheel 50 laterally toward and away from the driving rollers 102 to and from a normal retracted position and a forward cutting position, in the latter of which the cutting wheel is in cutting engagement with the resistor 21.

A shifting element 160 (FIGS. 3 and 8) in the form of a sleeve is mounted on the bushings 147 between the arms of the holder 145 in concentric relation to the fixed rod 149 and is pivotally connected to one end of a shifting lever 161. Intermediate its ends the shfting lever 161 is pivotally mounted on a support 163 and at its opposite end the lever has a cam follower 164 engageable in the peripheral cam groove of a cam 166 on the cam shaft 96. The cam 166, through the lever 161, imparts axial movement to the cutting wheel 50 while it is in the cutting position to effect the cutting of the helical groove 20 in the resistor 21.

During the groove cutting operation, the leads 23 of the resistor 21 are in engagement with flexible wire brushes 170 (FIGS. 4 and 5) which are supported in insulating blocks 171 on the hopper plates 51 and are electrically connected to a resistance measuring device in a control circuit 172, indicated diagrammatically in FIG. 5. When the resistance has reached a preselected value the control circuit effects the energization of the solenoid 119 resulting in the retraction of the positioning member 116 and the movement of the driving rollers 102 away from each other to the second position thereby permitting the movement of the resistor 21 from the cutting wheel 50 to the non-cutting position under the influence of the spring-biased backup rollers 104.

As the backup rollers 104 move the resistor 21 to the non-cutting position, an arm 174 on the roller supporting member 125 actuates a switch 175 associated with a counting device in a control circuit 176 (FIG. 6) to count the resistors as they are cut.

On complettion of the cutting of the helical groove in the resistor 21, the rocker arm 90 is oscillated under control of the cam 95 and spring 94 to effect the movement of the driving rollers 102 from the intermediate position (FIG. 6) to the lower position (FIG. 7), and the release of the resistor 21 therefrom. The resistor drops into a lower hopper 180 which comprises two sets of vertically disposed plates 181 positioned in vertical alignment with the upper hopper plates 51 and each set of plates 181 having a slot 182 extending vertically therethrough for receiving the leads 23 of the resistors 21. The lower hopper plates 181 extend downwardly through an opening 183 in the horizontal frame plate 54 to the underside thereof and are suitably supported by rods 184 secured to the vertical frame plate 53 (FIG. 4).

Mechanism including a latch or retaining member 186 is provided for releasably retaining the resistors in the lower hopper until a predetermined number thereof have accumulated and for actuating the retaining member 186 to release the accumulated resistors for movement from the hopper. The retaining member 186 is positioned between the two sets of hopper plates 181 and is secured to a shaft 187. The shaft 187 which is supported in the hopper plates 181 for turning movement is stressed by a spring 188 (FIG. 6) to a normal closed position with the end of the retaining member in the path of movement of the resistors for engaging the caps of the lowermost resistor in the hopper to arrest the downward movement thereof. Movement of the retaining member 186 to an open position is effected by a solenoid 190 which is operatively connected to the shaft 187 through suitable linkage including a lever 191 and an arm 192 as shown in FIGS. 4 and 7.

In response to the movement of the retaining member 186 to an open position the row of resistors 21 in the lower hopper move downwardly from the hopper into a pair of aligned slots 27 of a magazine 25 supported therebeneath in an upright position on a pair of conveyor belts 196. The conveyor belts 196 are supported on a lower platform 197 which is similar to the upper platform 42 and is supported on the vertical frame members 46. The drive mechanism for intermittently advancing the belt is also the same as that for the upper conveyor and includes a one-way driving connected 198 pivotally mounted on a piston rod 200 of a fluid-operated actuator 201, and control means including a switch 204 (FIG. 3) mounted on the platform 197 and having an actuating rollers 205 cooperating with the row of apertures 76 of the side plates 30 of the magazine.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for cutting a groove in a cylindrical article:
   a rotary cutting wheel mounted on one side of a predetermined axis for movement toward the axis to an operative position in engagement with one side of such an article supported in cutting position on the axis;
   a pair of backup rollers mounted on the one side of the axis and biased toward the axis for engaging longitudinally spaced portions of the one side of the article;
   a pair of driving rollers mounted on the other side of and in parallel relation to said axis and for movement to a first position for engaging circumferentially spaced portions of the other side of the article and cooperating with said backup rollers to support the article for rotation in the cutting position;
   means for rotating said driving rollers to impart rotation to the article; and
   means for moving said driving rollers from said first position to effect the disengagement of the article from said cutting wheel under the influence of said biased backup rollers.

2. The combination as defined in claim 1 wherein said backup rollers are provided with surfaces engageable with end portions of the article for preventing axial movement of the article while the groove is being cut therein.

3. In an apparatus for cutting a groove in a cylindrical article:
   a pair of driving rollers for rotating the article;
   means for supporting the driving rollers in a normal first position in a predetermined spaced relation to each other on one side of and parallel to a predetermined axis for engaging circumferentially spaced portions of one side of such an article supported on the axis;
   a pair of backup rollers mounted on the other side of the axis for engaging the end surfaces and longitudinally spaced portions of the other side of the article and cooperable with said driving rollers to support the article for rotation in a cutting position on the axis;
   resilient means for urging said backup rollers toward said driving rollers and the axis;
   means for rotating the driving rollers to impart rotation to the article;
   a rotary cutting wheel mounted on the other side of said axis between said backup rollers for movement toward said axis to an operative position in engagement with the other side of the article; and
   means for moving said driving rollers relative to each other from said first position to effect the disengagement of the article from said cutting wheel under the influence of said backup rollers.

4. An apparatus for cutting grooves in cylindrical articles comprising:
   a pair of backup rollers mounted on one side of a first axis and biased toward the axis for engaging the ends and longitudinally spaced portions of one side of such an article supported in a cutting position on the axis;
   a rotary cutting wheel mounted on the one side of the first axis between said backup rollers for movement toward the axis to an operative position in engagement with the one side of the article in the cutting position;
   a pair of driving rollers;
   holders for supporting said driving rollers on the other side of the first axis in parallel relation thereto and for pivotal movement about a second axis parallel to the first axis and on the other side thereof;
   means for biasing said holders for movement of said driving rollers toward each other;
   a cam member mounted in a normal position between said holders for supporting said driving rollers in a predetermined spaced relation to each other and movable to a second position to increase the distance between said driving rollers;
   means for pivoting said holders about the second axis to move said driving rollers together to an upper position, an intermediate position, and a lower position; said driving rollers in the upper position cooperating with said backup rollers for receiving an article and for moving the article to the cutting position to response to movement of said driving rollers to the intermediate position, and operable in said intermediate position for engaging circumferentially spaced portions of the other side of the article and cooperable with said backup rollers to support the article for rotation in the cutting position, and said driving rollers in response to movement thereof to the lower position serving to move the article downward from the cutting position and to effect the release thereof;
   means for rotating said driving rollers to impart rotation to the article; and
   means for moving said cam member to the second position when said driving rollers are in the intermediate position to effect the separation of said driving rollers and the disengagement of the article from said cutting wheel under the influence of said biased backup rollers.

5. An apparatus as defined in claim 4 including:
   an upper hopper mounted above said driving rollers for holding a supply of the articles and for guiding successive articles into engagement with said driving rollers and said backup rollers;
   means for releasably retaining the articles in said upper hopper; and
   means responsive to the movement of driving rollers to the upper position for actuating said retaining means to effect the release of an article from said hopper.

6. An apparatus as defined in claim 4 including:
   a lower hopper mounted beneath said driving rollers for receiving the articles as they are released from the cutting position;
   latch means for releasably retaining the articles in said lower hopper;
   means for counting the number of articles received in the hopper; and
   means under control of said counting means for actuating said latch means to release the articles from said lower hopper.

7. In an apparatus for cutting a helical groove in a cylindrical resistor the combination of:
   a pair of laterally spaced parallel driving rollers supported in a normal first position for engaging circumferentially spaced peripheral portions of one side of the resistor;
   a pair of backup rollers engageable with spaced longitudinal portions of the other side of the resistor and biased toward said driving rollers to support the resistor thereagainst in a cutting position;
   means for rotating said driving rollers to impart rotation to said resistor;
   a rotary wheel disposed between said backup rollers for cutting a groove in the resistor;
   means for rotating said wheel;
   means for moving said wheel sequentially toward said driving rollers into engagement with the other side of the resistor and for moving said wheel axially of the resistor;
   means for measuring the resistance of the resistor; and
   means under control of said measuring means and operable when the resistance has reached a prescribed value for moving said driving rollers to a second position to effect the disengagement of the resistor from said wheel under the influence of said backup rollers.

8. An apparatus for cutting grooves in cylindrical resistors comprising:
   a pair of backup rollers mounted on one side of a first axis and biased toward the axis for engaging the ends and longitudinally spaced portions of one side of such a resistor supported in a cutting position on the axis;
   a rotary cutting wheel mounted on the one side of the first axis between said backup rollers;
   means for sequentially moving said cutting wheel toward the axis into engagement with the one side of the resistor in the cutting position and axially of the article;
   a pair of driving rollers;
   holders for supporting said driving rollers on the other side of said axis in parallel relation thereto and for pivotal movement about a second axis parallel to and on the other side of the first axis;
   means for biasing said holders for movement of said rollers toward each other to a normal position in a predetermined spaced relation to each other;
   means for pivoting said holders about the second axis to move said driving rollers together to an upper position, an intermediate position, and a lower position; said driving rollers in the upper position cooperating with said backup rollers for receiving an article and for moving the resistor to the cutting position concentric with the first axis in response to movement of said driving rollers to the intermediate position, said driving rollers in said intermediate position being engageable with circumferentially spaced portions of the other side of the resistor and cooperable with said backup rollers to support the resistor for rotation in the cutting position, and said driving rollers in response to movement thereof to the lower position serving to move the resistor from the cutting position and to effect the release thereof;
   means for rotating said driving rollers to impart rotation to the resistor;
   means for measuring the resistance of the resistor; and
   means under control of said measuring means and rendered effective when the resistance of the resistor has reached a predetermined value to effect a limited movement of said driving rollers from each other and the disengagement of the resistor from said cutting wheel under the influence of said biased backup rollers.

9. Apparatus as defined in claim 8 including:
   a hopper for releasably holding a row of the resistors above said driving rollers and said backup rollers;
   means responsive to the movement of said driving rollers to the upper position for releasing a resistor from said hopper;
   a magazine having a plurality of slots therein in laterally spaced relation to one another for supporting rows of resistors therein;

members yieldably supported in a first position on said magazine adjacent the lower ends of said slots for retaining the rows of resistors therein;

conveyor means for supporting a row of said magazines for horizontal movement along a predetermined path above said hopper;

stationarily mounted means on said hopper in the path of movement of said retaining members for turning successive ones of said members from the first position to release the rows of resistors in said slots;

drive means for actuating said conveyor;

means responsive to the movement of the row of resistors in said hopper below a predetermined level for rendering said drive means operative;

elements spaced on said magazines corresponding to the spacing of said slots; and means including a feeler engageable with said row of magazines and actuated by said elements thereon to render said drive means unoperative to effect the stopping of said conveyor with the following row of resistors of said magazines in alignment with said hopper.

10. A magazine for resistors each having a body with leads extending from opposite ends of the body which comprises:

a pair of laterally spaced parallel outer plates for receiving the resistors lengthwise therebetween;

a pair of inner plates positioned between said outer plates for receiving the bodies of the resistors therebetween;

means for supporting said inner and outer plates in laterally spaced and parallel relation to one another;

said inner plates having aligned slots extending from the upper edge thereof for receiving the resistor leads to support the resistors in rows; and retaining means yieldably mounted between said inner plates and adjacent the upper portion thereof for movement to a first position for retaining the row of resistors against movement from the slots in response to inversion of the magazine, and for movement to a second position for releasing the resistors, the retaining member being so arranged that in response to inversion of the magazine and horizontal movement thereof along a predetermined path the retaining members may be engaged successively by a stationary element in its path and moved from the first position to the second position.

References Cited by the Examiner
UNITED STATES PATENTS

| | | | |
|---|---|---|---|
| 2,669,811 | 2/1954 | Henderson | 51—37 |
| 2,710,325 | 6/1955 | Johnson | 219—69 |
| 2,773,332 | 12/1956 | Buchman et al. | 51—15 |
| 2,884,746 | 5/1959 | Rus et al. | 51—37 |
| 3,138,065 | 6/1964 | Owens et al. | 90—11.64 |

LESTER M. SWINGLE, *Primary Examiner.*